United States Patent [19]
Sasanuma

[11] Patent Number: 5,875,036
[45] Date of Patent: *Feb. 23, 1999

[54] IMAGE PROCESSING APPARATUS WHICH SEPARATES AN IMAGE SIGNAL ACCORDING TO DENSITY LEVEL

[75] Inventor: Nobuatsu Sasanuma, Yamato, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 486,250

[22] Filed: Jun. 7, 1995

Related U.S. Application Data

[63] Continuation of Ser. No. 352,687, Nov. 30, 1994, abandoned, which is a continuation of Ser. No. 789,251, Nov. 7, 1991, abandoned.

[30] Foreign Application Priority Data

Nov. 8, 1990 [JP] Japan .................................... 2-300961

[51] Int. Cl.$^6$ ................................ G03F 3/08; G06K 9/00
[52] U.S. Cl. ......................... 358/298; 358/518; 358/456; 382/162
[58] Field of Search .................................... 358/298, 452, 358/453, 455–466, 515, 518, 522, 530–532, 534, 538, 521, 540; 382/162, 164, 165, 167–172, 190–192, 254, 264, 266; 395/101, 114, 128, 129

[56] References Cited

U.S. PATENT DOCUMENTS

| | | | |
|---|---|---|---|
| 4,707,745 | 11/1987 | Sakano | 358/298 |
| 4,884,080 | 11/1989 | Hirahara et al. | 358/298 X |
| 4,922,335 | 5/1990 | Outa et al. | 358/80 |
| 4,980,758 | 12/1990 | Matsunawa et al. | 358/530 |
| 4,980,760 | 12/1990 | Hiratsuka et al. | 358/80 |
| 5,016,096 | 5/1991 | Matsunawa et al. | 358/453 X |
| 5,079,624 | 1/1992 | Sasuga et al. | 358/530 |
| 5,091,967 | 2/1992 | Ohsawa | 358/458 X |
| 5,119,185 | 6/1992 | Ikeda et al. | 358/75 |
| 5,121,447 | 6/1992 | Tanioka et al. | 358/466 X |
| 5,153,925 | 10/1992 | Tanioka et al. | 358/466 X |
| 5,165,072 | 11/1992 | Kurita et al. | 358/448 |
| 5,166,810 | 11/1992 | Sorimachi et al. | 358/462 |
| 5,200,841 | 4/1993 | Kotaki et al. | 358/455 |
| 5,339,365 | 8/1994 | Kawaj et al. | 382/54 |
| 5,420,938 | 5/1995 | Funada et al. | |

Primary Examiner—Peter S. Wong
Assistant Examiner—Gregory J. Toatley, Jr.
Attorney, Agent, or Firm—Fitzpatrick, Cella, Harper & Scinto

[57] ABSTRACT

An image processing apparatus in which a density band separating circuit separates an image signal having different density levels into two areas as determined by a threshold density level. Image signals above the threshold are defined as shadow section density signals, and those below are defined as other density signals. The shadow section density signals are smoothed in a smoothing filter. The smoothed shadow section density signals and the other density signals are recombined by a look-up table process. The recombined density signals are pulse-width modulated to drive a printing device.

11 Claims, 17 Drawing Sheets

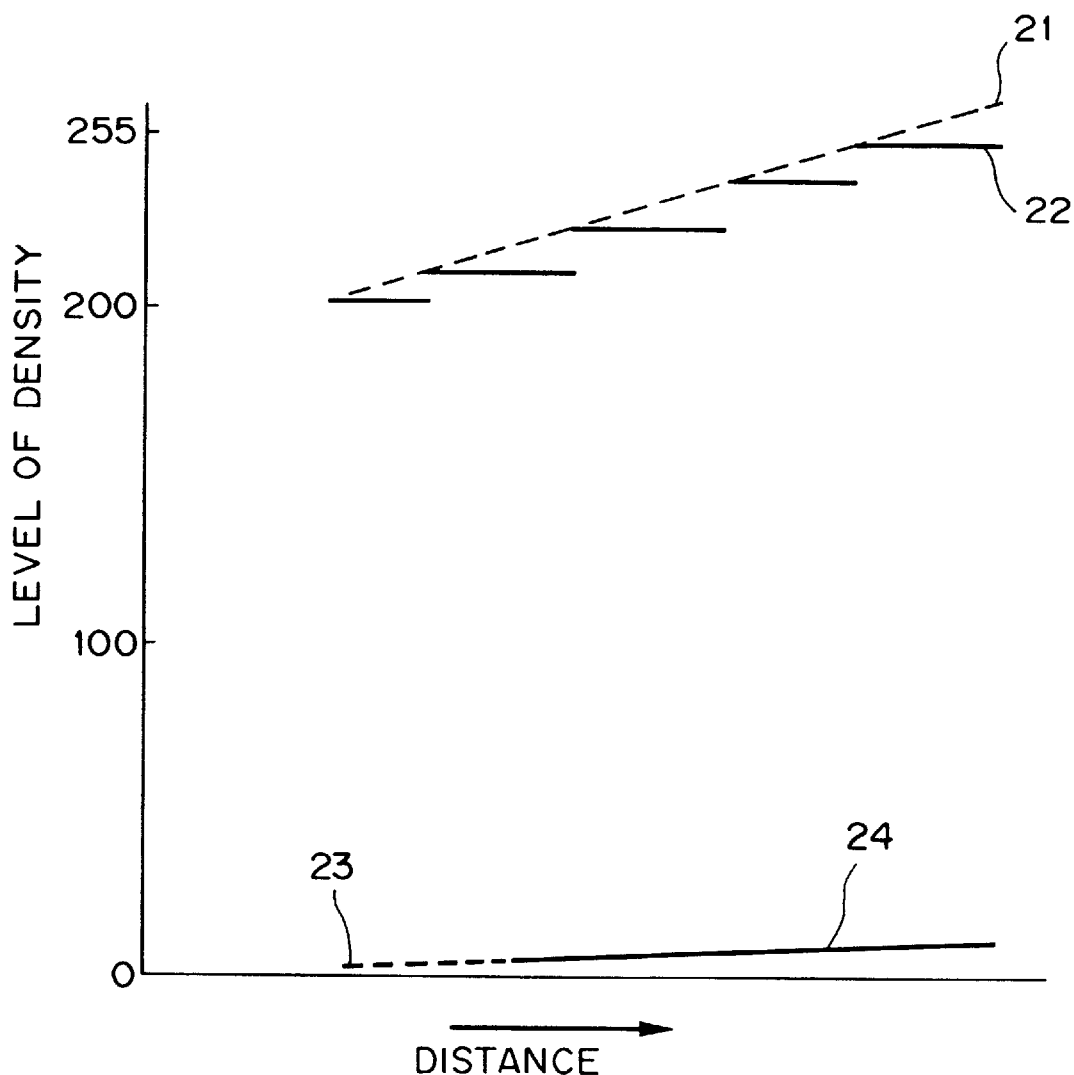
F I G. 5

|  | (SHADOW SECTION) DENSITY SEPARATION LEVEL | (HIGHLIGHTED SECTION) DENSITY SEPARATION LEVEL |
|---|---|---|
| CYAN | 150 | 30 |
| MAGENTA | 150 | 40 |
| YELLOW | 120 | 40 |
| BLACK | 150 | 30 |

F I G. 11

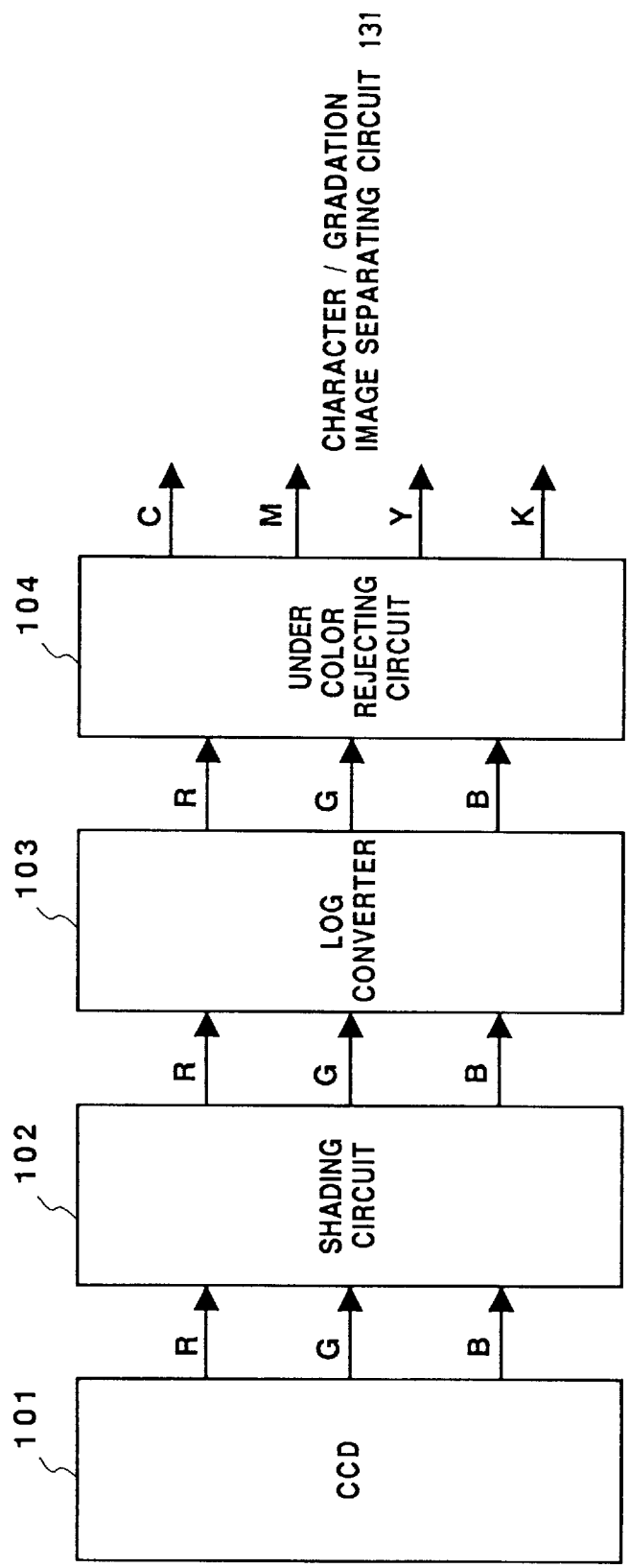
F I G. 13A $$\begin{pmatrix} 0 & 0 & 0 & 0 \\ 0 & 0 & 0 & 0 \\ 0 & 0 & 0 & 0 \\ 0 & 0 & 0 & 0 \end{pmatrix} \begin{pmatrix} 1 & 1 & 1 & 1 \\ 1 & 1 & 1 & 1 \\ 1 & 1 & 1 & 1 \\ 1 & 1 & 1 & 1 \end{pmatrix}$$

$$\begin{pmatrix} 1 & 1 & 1 & 1 \\ 1 & 1 & 1 & 1 \\ 0 & 0 & 0 & 0 \\ 0 & 0 & 0 & 0 \end{pmatrix} \begin{pmatrix} 0 & 0 & 0 & 0 \\ 0 & 0 & 0 & 0 \\ 1 & 1 & 1 & 1 \\ 1 & 1 & 1 & 1 \end{pmatrix} \begin{pmatrix} 1 & 1 & 0 & 0 \\ 1 & 1 & 0 & 0 \\ 1 & 1 & 0 & 0 \\ 1 & 1 & 0 & 0 \end{pmatrix} \begin{pmatrix} 0 & 0 & 1 & 1 \\ 0 & 0 & 1 & 1 \\ 0 & 0 & 1 & 1 \\ 0 & 0 & 1 & 1 \end{pmatrix}$$

$$\begin{pmatrix} 1 & 1 & 0 & 0 \\ 1 & 1 & 0 & 0 \\ 0 & 0 & 0 & 0 \\ 0 & 0 & 0 & 0 \end{pmatrix} \begin{pmatrix} 0 & 0 & 1 & 1 \\ 0 & 0 & 1 & 1 \\ 0 & 0 & 0 & 0 \\ 0 & 0 & 0 & 0 \end{pmatrix} \begin{pmatrix} 0 & 0 & 0 & 0 \\ 0 & 0 & 0 & 0 \\ 1 & 1 & 0 & 0 \\ 1 & 1 & 0 & 0 \end{pmatrix} \begin{pmatrix} 0 & 0 & 0 & 0 \\ 0 & 0 & 0 & 0 \\ 0 & 0 & 1 & 1 \\ 0 & 0 & 1 & 1 \end{pmatrix}$$

$$\begin{pmatrix} 1 & 1 & 1 & 1 \\ 0 & 0 & 0 & 0 \\ 1 & 1 & 1 & 1 \\ 0 & 0 & 0 & 0 \end{pmatrix} \begin{pmatrix} 0 & 0 & 0 & 0 \\ 1 & 1 & 1 & 1 \\ 0 & 0 & 0 & 0 \\ 1 & 1 & 1 & 1 \end{pmatrix} \begin{pmatrix} 1 & 0 & 1 & 0 \\ 1 & 0 & 1 & 0 \\ 1 & 0 & 1 & 0 \\ 1 & 0 & 1 & 0 \end{pmatrix} \begin{pmatrix} 0 & 1 & 0 & 1 \\ 0 & 1 & 0 & 1 \\ 0 & 1 & 0 & 1 \\ 0 & 1 & 0 & 1 \end{pmatrix}$$

$$\begin{pmatrix} 0 & 0 & 1 & 1 \\ 0 & 0 & 1 & 1 \\ 1 & 1 & 1 & 1 \\ 1 & 1 & 1 & 1 \end{pmatrix} \begin{pmatrix} 1 & 1 & 0 & 0 \\ 1 & 1 & 0 & 0 \\ 1 & 1 & 1 & 1 \\ 1 & 1 & 1 & 1 \end{pmatrix} \begin{pmatrix} 1 & 1 & 1 & 1 \\ 1 & 1 & 1 & 1 \\ 0 & 0 & 1 & 1 \\ 0 & 0 & 1 & 1 \end{pmatrix} \begin{pmatrix} 1 & 1 & 1 & 1 \\ 1 & 1 & 1 & 1 \\ 1 & 1 & 0 & 0 \\ 1 & 1 & 0 & 0 \end{pmatrix}$$

F I G. 14

IMAGE PROCESSING APPARATUS WHICH SEPARATES AN IMAGE SIGNAL ACCORDING TO DENSITY LEVEL

This application is a continuation of application Ser. No. 08/352,687 filed Nov. 30, 1994, now abandoned, which is a continuation of application Ser. No. 07/789,251 filed Nov. 7, 1991, which is now abandoned.

BACKGROUND OF THE INVENTION

1. Field of the Invention

The present invention relates to an image processing apparatus, having a single-color image reproduction method and a multi-color image reproduction method, that outputs gradational images by digital image processing.

2. Description of the Related Art

In the prior art, digital electrophotographic apparatus processes single color gradations of an input image signal.

Referring to FIG. 1 showing this apparatus, processes of reproducing a single color image will be explained.

In FIG. 1, brightness signals of an image are obtained by a CCD 21, and are provided to a shading circuit 22 which corrects for variations in the sensitivity of each CCD element. To convert corrected brightness signals to density signals, the signals are processed by a LOG converter 23. The density signals are provided to a look-up table (LUT) 24 which compensates for gradational conversion due to influences of electrophotographic development characteristics. A pulse width modulator 25 converts the density signals into signals corresponding to dot widths, which are sent to a laser driver 26 for exposing a print medium (not shown).

According to the above-described digital signal processing, a latent image having gradational characteristics caused by changes in the dot area is formed on a photosensitive body (not shown) by laser scanning. A gradational image is obtained, following development, transferring and fixing.

When a full-color gradational image is reproduced, the additional processes of color separation, removal of a base color, masking, etc. are performed. Although a plurality of color signals undergo parallel processing, the method of reproducing the gradation of each color is the same as for a single color as explained above.

In the above-described prior art, however, brightness signals are usually input in units of eight bits, i.e., 256 different gradations, because of the limited brightness separation levels of the CCD 21.

FIG. 2 is a diagram in which brightness signals undergo a density LOG conversion. As can be seen in this figure, in sections where brightness is high, namely, where density is low, the level of density is the same even if levels of brightness are different. On the other hand, in sections where brightness is low, namely, where density is high, a phenomenon occurs in which the density jumps several levels when brightness is different by only one level.

The above explanation will now be supplemented with reference to the graph shown in FIG. 3, in which an original image density is plotted on a horizontal axis and the level of density converted from start signals by CCD input is plotted on a vertical axis. As can be seen from this graph, the higher the density, the more difficult it is to determine the level of density. Therefore, even if a signal has a brightness level of 256, about 50% of the data is lost when the density is LOG converted.

As can be understood from this phenomenon, there is a problem in that the gradation of a high-density shadow section of an image cannot be accurately reproduced. In a highlighted section, there is a tendency that reproduced densities which are less than a density of 0.1 are apt to be lost.

This phenomenon causes smooth highlighted gradation to be quite poor. This results in a problem that light shades of color cannot be reproduced by multi-color reproduction.

When repeated copies are made from a generation copy used as a manuscript, the density data of the shadow and highlighted sections are considerably diminished. These problems are major factors contributing to overall image deterioration.

SUMMARY OF THE INVENTION

An object of the present invention is to provide an image processing apparatus which can solve the above-mentioned problems of the prior art.

Another object of the present invention is to provide an image processing apparatus which is capable of obtaining excellent gradation images by compensating in a simulated manner the gradation of both a shadow section and a highlighted section.

A still further object of the present invnetion is to improve gradations of color images which are to be outputted.

A still further object of the present invention is to perform operations appropriate for line images, such as characters, and half-tone images.

A still further object of the present invention is to provide an image processing apparatus comprising input means for inputting image data representing a single image, process means for changing spatial frequency characteristics of an input image data of a single image in accordance with a range of density level of the input image data.

A still further object of the present invention is to provide an image processing apparatus comprising input means for inputting a plurality of color component signals representing a color image, process means for changing spatial frequency characteristics of color component signals in a predetermined range of density level of the input color component signals.

A still further object of the present invention is to provide an image processing apparatus comprising input means for inputting image data representing an image, detection means for detecting a dark part of the image or a high-light part of the image in the image data, process means for changing spatial frequency characteristics of the dark part of the image or the high-light part of the image.

A further object of the present invention is to provide an image processing apparatus comprising smoothing means for smoothing and outputting inputted gradational density signals, non-smoothing means for outputting inputted gradational density signals without the signals being smoothed, and execution control means for controlling the execution of either the smoothing means or the non-smoothing means on the basis of the inputted gradational density signals.

A still further object of the present invention is to provide an image processing apparatus comprising inputting means for inputting gradational density data, separating means for separating out density data of a predetermined density band from the density data inputted one after another via the inputting means, smoothing means for smoothing density data separated by the separating means, and an appending and outputting means for appending and outputting the density data which has not been separated by the separating means, and density data which has been smoothed by the smoothing means.

The aforementioned and other objects, features and advantages of the present invention will become clear when reference is made to the following description of the preferred embodiments of the present invention, together with reference to the accompanying drawings.

BRIEF DESCRIPTION OF THE DRAWINGS

FIG. 5 is a diagram which illustrates a level of density of an image whose density is determined according to the first embodiment;

FIG. 11 is a table which shows the density separation level of colors for the shadow and highlighted sections according to the fourth embodiment;

FIGS. 13A and 13B are block diagrams which illustrate a fifth embodiment of the invention;

FIG. 14 is a table of matrices by means of which a character/gradation image is separated.

DESCRIPTION OF THE PREFERRED EMBODIMENTS

Preferred embodiments of the present invention will be explained below with reference to the accompanying drawings.

(First Embodiment)

Figure 4:
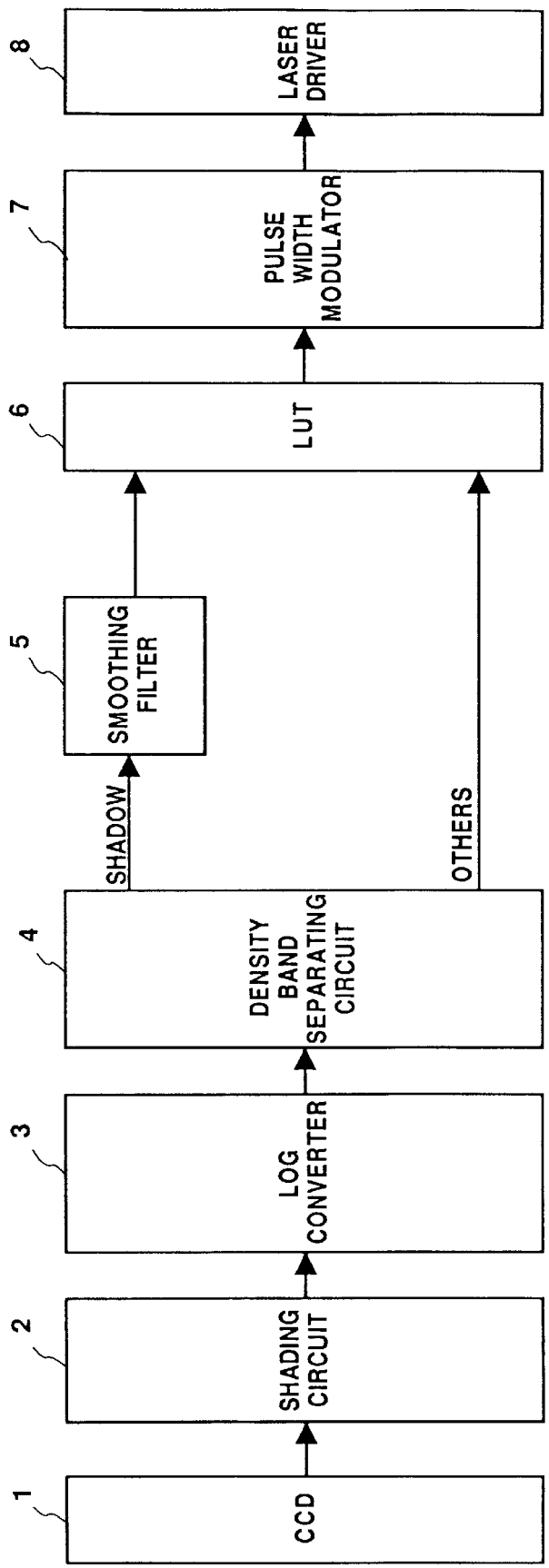
FIG. 4 is a block diagram which illustrates the internal construction of an essential portion of a digital electrophotographic copier of a first embodiment of the present invention.

FIG. 4 is a block diagram which illustrates the internal construction of an essential portion of a digital electrophotographic copier of a first embodiment of the present invention. In this figure, reference numeral 1 denotes a CCD; reference numeral 2 denotes a shading circuit; reference numeral 3 denotes a LOG converter; reference numeral 4 denotes a density band separating circuit; reference numeral 5 denotes a smoothing filter; reference numeral 6 denotes a look-up table (LUT); reference numeral 7 denotes a pulse width modulator circuit; and reference numeral 8 denotes a laser driver.

The flow of data according to the above-described construction will be explained below.

Figure 6:
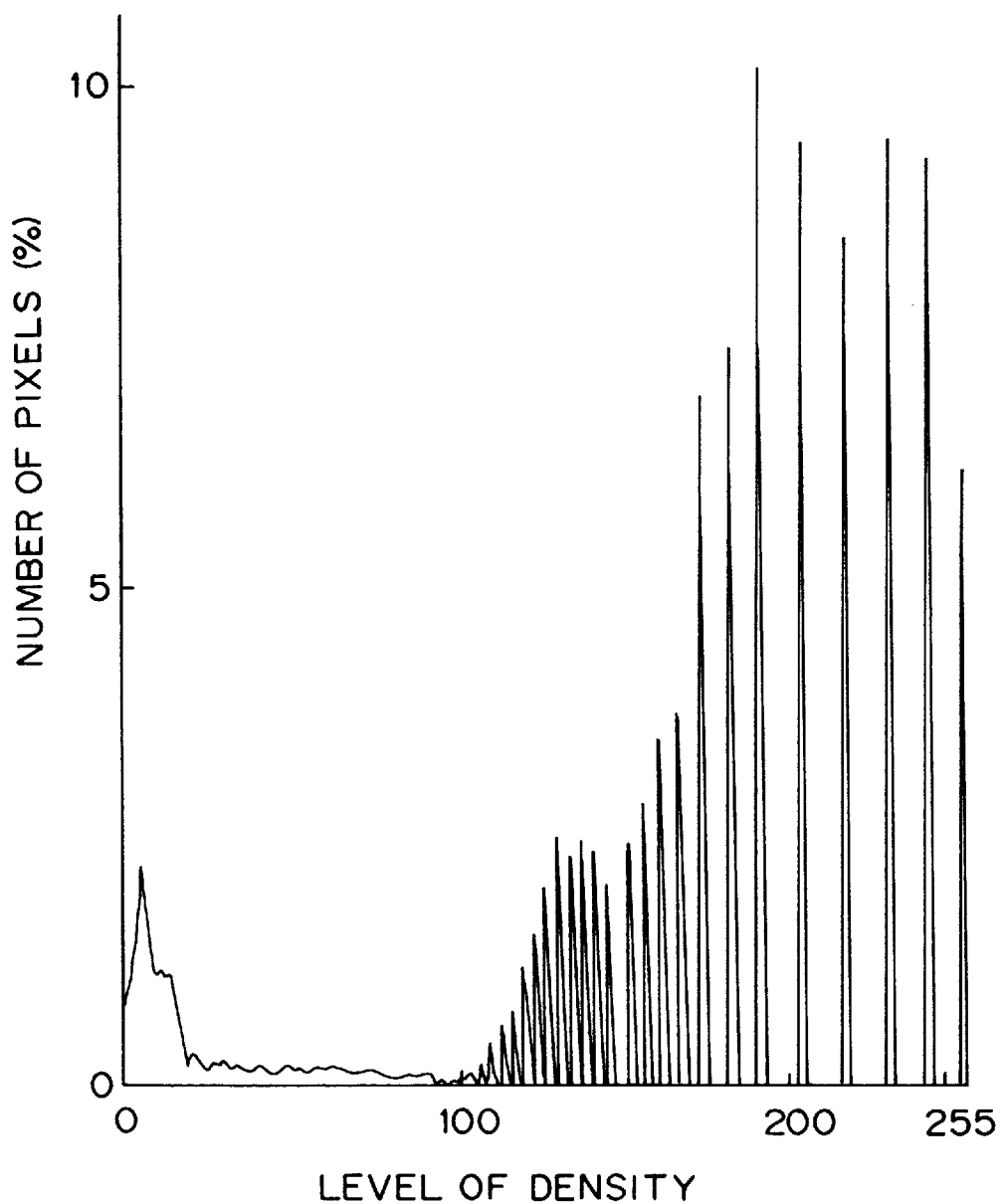
FIG. 6 is a diagram which shows a histogram of a standard level of density.
Figure 7:
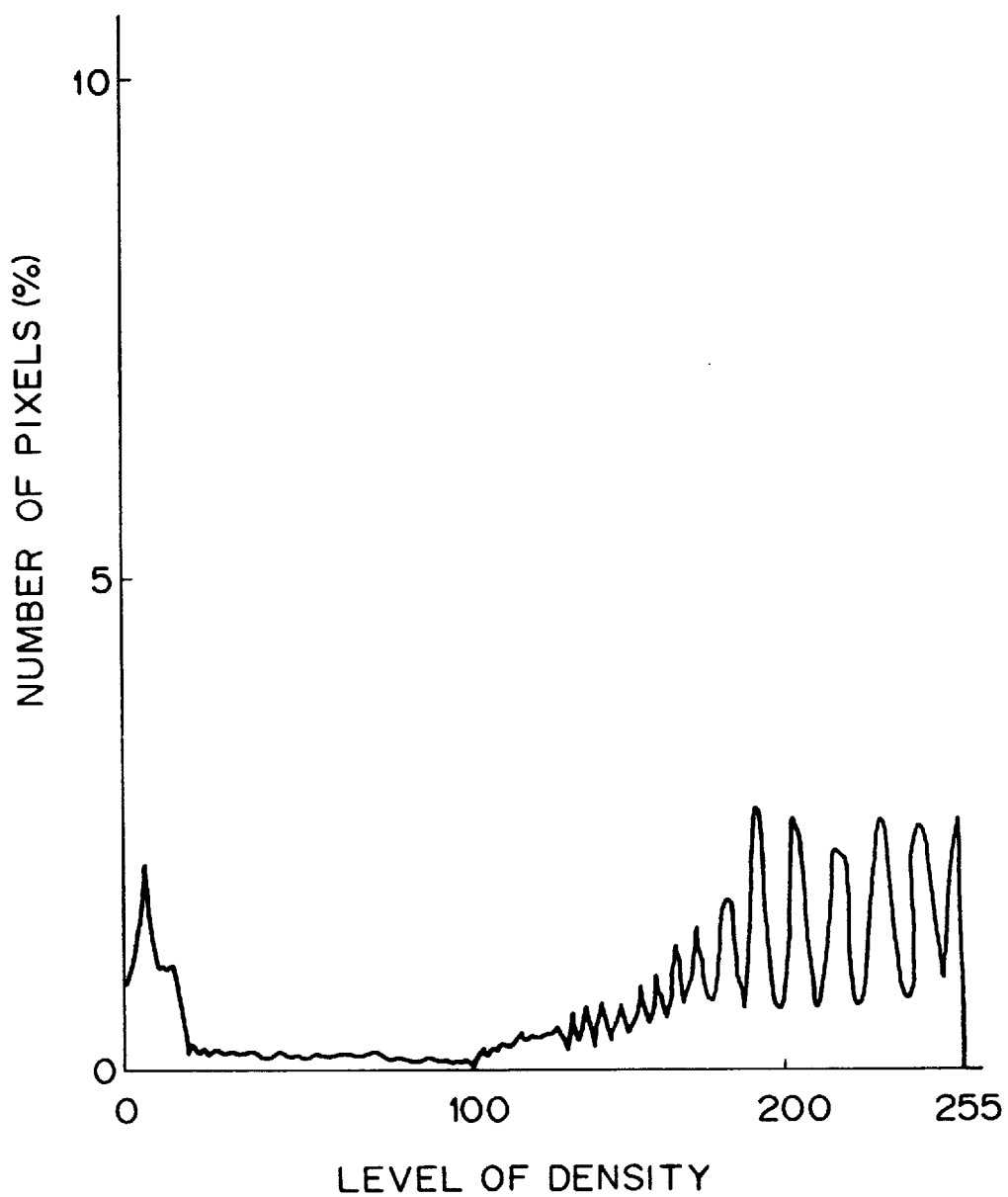
FIG. 7 is a diagram which shows a histogram of a level of density according to the first embodiment.

FIG. 5 is a diagram which illustrates a level of density of an image whose density is determined according to the first embodiment. FIG. 6 is a diagram which shows a histogram of a standard level of density. FIG. 7 is a diagram which shows a histogram of the density level according to the first embodiment.

A manuscript image is read and converted into brightness signals by CCD 1. These brightness signals pass through a shading circuit 2 which compensates for variations in the sensitivity of the CCD elements. The brightness signals are converted into density signals by a LOG converter 3. In this embodiment, a density of 2.0 corresponds to a density level of 255.

Figure 1:
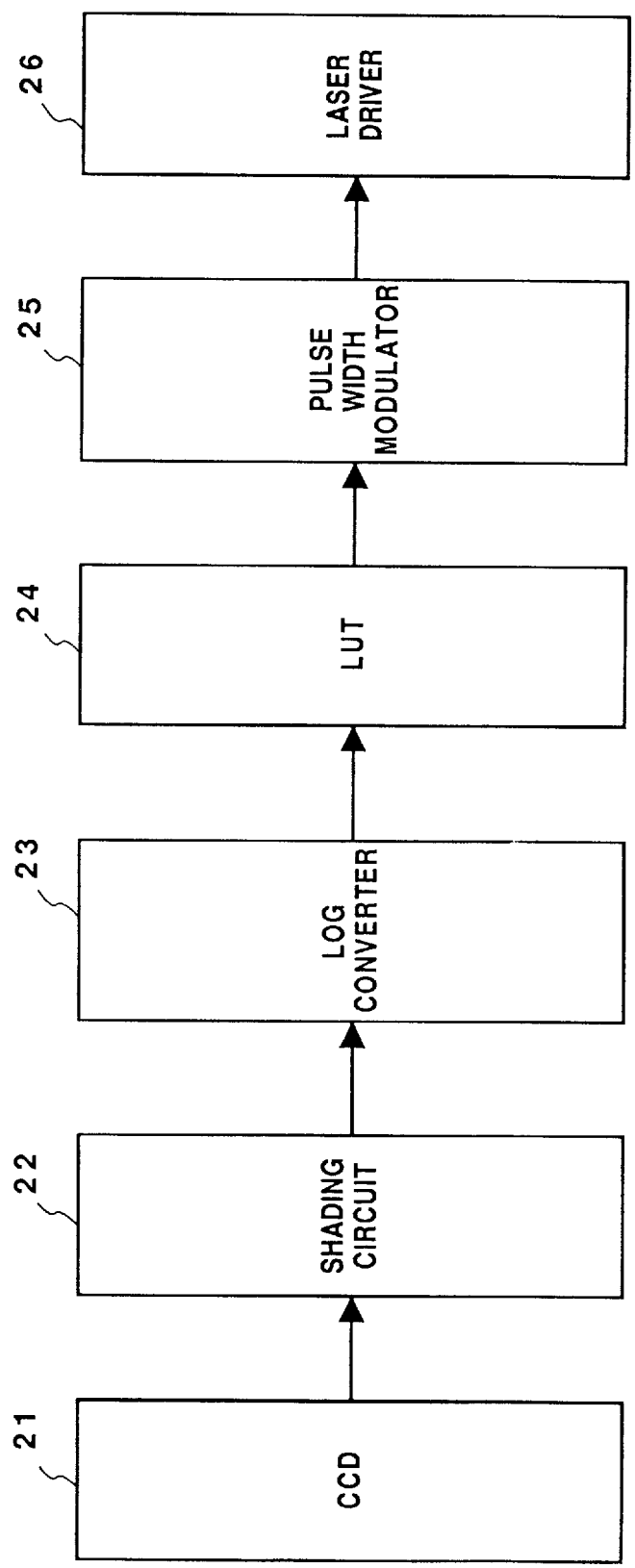
FIG. 1 is a block diagram which illustrates an example of the internal construction of an essential portion of a copier of the prior art.
Figure 2:
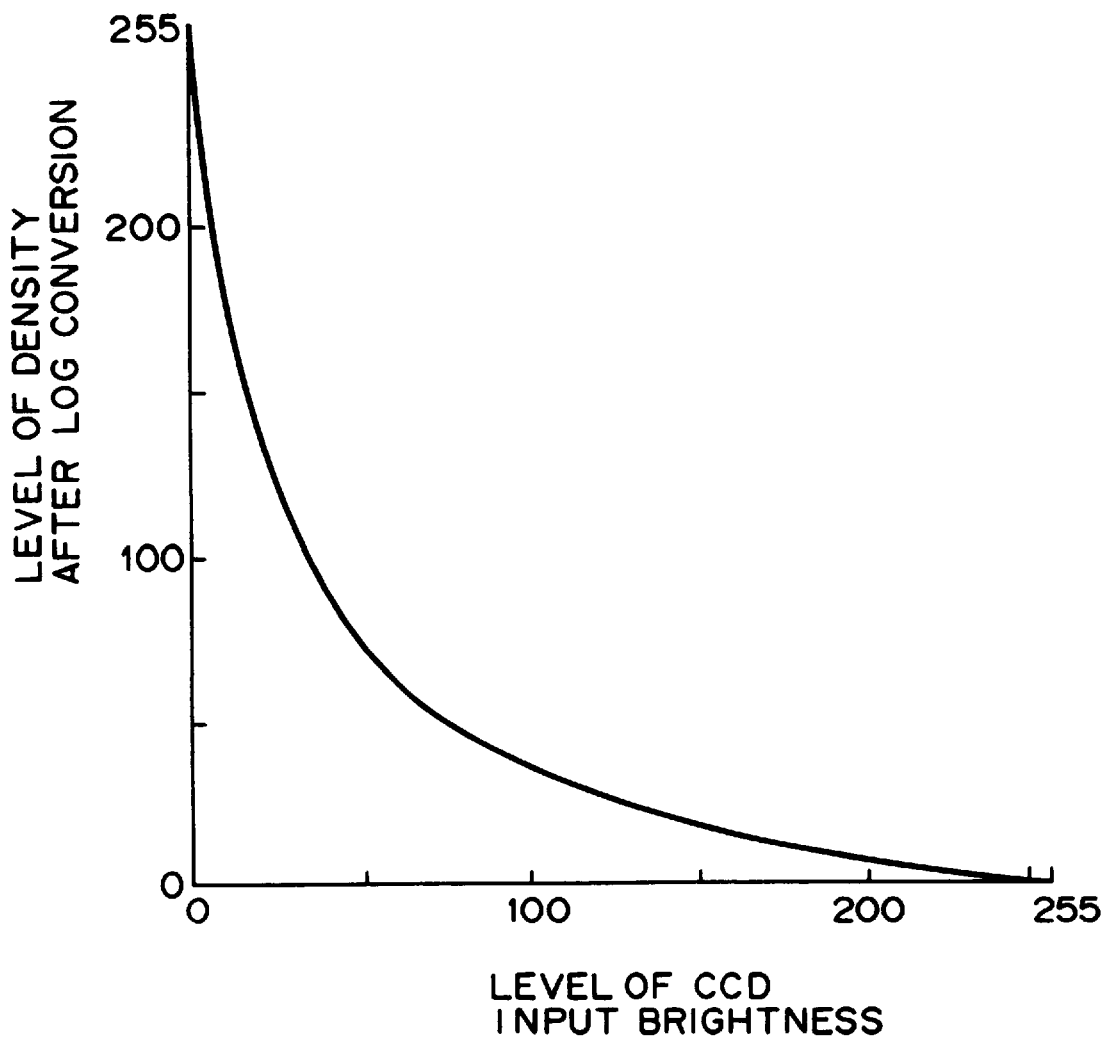
FIG. 2 is a diagram which illustrates the relationship between a level of CCD input brightness and a level of density after LOG conversion.
Figure 3:
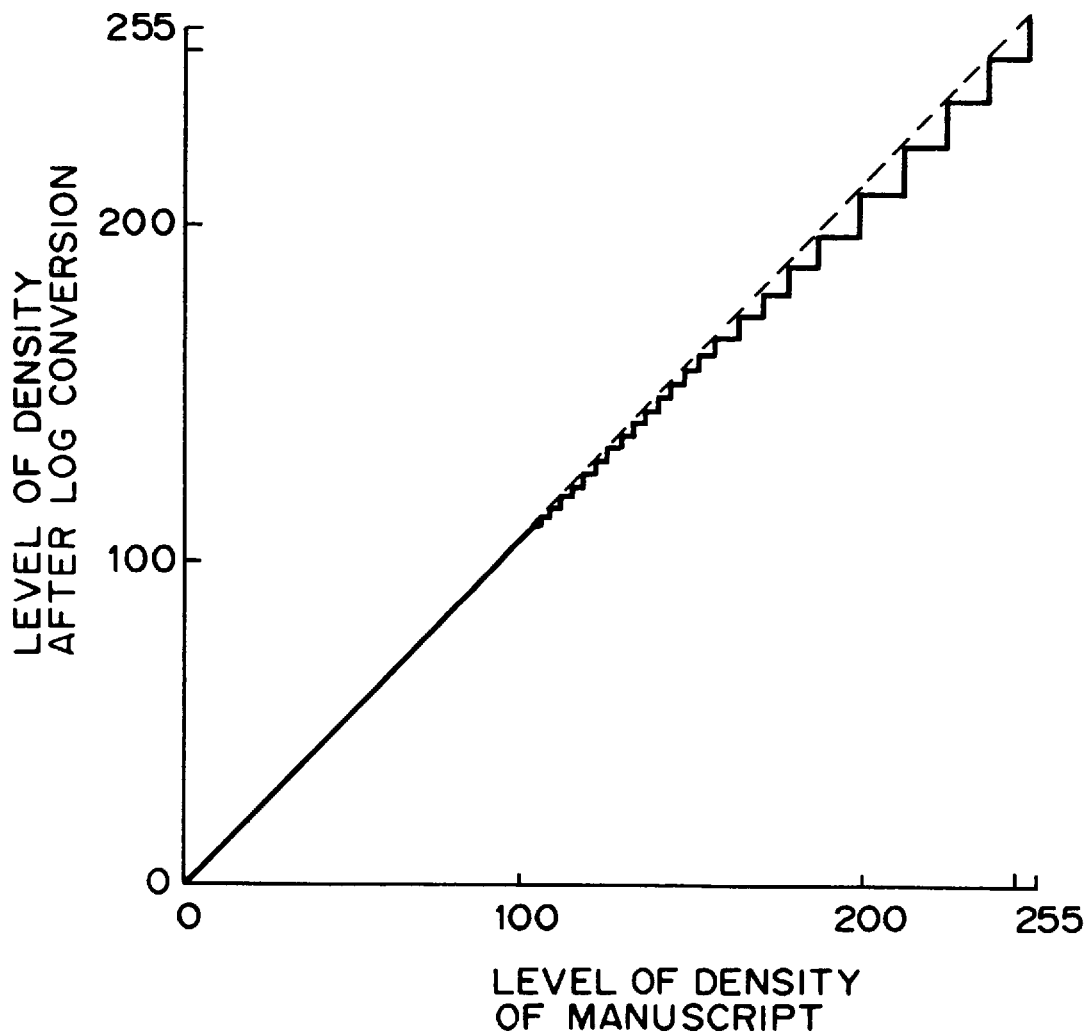
FIG. 3 is a diagram which illustrates the relationship between a level of density of a manuscript and a level of density after LOG conversion.

A density band separating circuit 4 separates an area of an image as a shadow section when the level of density signals is above a threshold value of 1.3. The shadow section density signals are output to a smoothing filter 5. Density signals whose level of density is smaller than the threshold value of 1.3 are shown as others, and are directly output to the LUT 6 without passing through the smoothing filter 5. The LUT 6 recombines the density signals from the shadow section outputted from the smoothing filter 5, and the other density signals corresponding to those other than the shadow section, which are directly received from the density band separating circuit 4. The signal from LUT 6 is processed by pulse width modulator 7 and laser driver 8 in a manner similar to that described for the like elements in FIG. 1. Density compensation corresponding to development characteristics for one image was performed.

A detailed explanation will now be given regarding separation by the density band separating circuit 4. In the separated shadow section, as indicated by a broken line 21 in FIG. 5, density signals of a manuscript which should primarily have smooth gradations are actually converted into intermittent density signals as indicated by a solid line 22. As compared with the above, the highlighted section, it can be seen that there is hardly any difference between original density signals (indicated by a broken line 23) of a manuscript and the actually read density signals (indicated by a solid line 24).

To compensate for smooth density gradation of the manuscript image from the density signals obtained by the LOG converter 3, a smoothing operation is performed. This smoothing operation is performed by using the smoothing filter 5 (FIG. 4) of W=¼ [1,2,1]. A calculation method by the smoothing filter 5 is as shown below:

$$g(x) = \sum_{i=1}^{3} W(i)f(x-i)$$

where f (x–i) is an input pixel density and g (x) is an output pixel density.

A smoothing operation includes, in addition to the above, one using a histogram. Various smoothing filters have been proposed. For example, there is "Highlighting and Smoothing Operations" (Shizuo Nakamura, O plus E, No. 75). From the above, a most suitable smoothing operation serving one's purpose is selected.

As described above, density signals separated by the density band separating circuit 4 as the shadow section are smoothed by the smoothing filter 5 and output to the LUT 6 at a later stage. On the other hand, those density signals separated as those which are other than the shadow section are not smoothed but directly output to the LUT 6 in order to compensate for the development characteristics.

The density signals through the LUT 6 are converted by a pulse width modulation circuit 7 into a pulse width corresponding to the density and sent to a laser driver 8.

When the present embodiment is not applied, namely, according to a standard histogram (FIG. 6), density signals after an operation by the LUT 6 are used as regards the level of density. It is shown that the histogram has only discrete levels at the high density levels.

An image having a histogram as shown in FIG. 6 is inferior in terms of the smoothness of the gradation. On the other hand, according to a histogram of density (FIG. 7) in a situation where the present embodiment is applied, the distribution of the histogram in the high density area is spread because of the smoothing operation, and the reproduced image has numerous gradations.

As has been explained above, according to the present embodiment, the deviation of data caused by the quantization of numeric values peculiar to digital processing is decreased by smoothing image signals in the density band of the characteristics, effecting a smooth gradational reproduction.

(Second Embodiment)

Although in the above-described first embodiment, a smoothing operation is performed on only the shadow section, the present invention is not limited to this case, as the smoothing operation may also be performed on the highlighted section.

Figure 8:
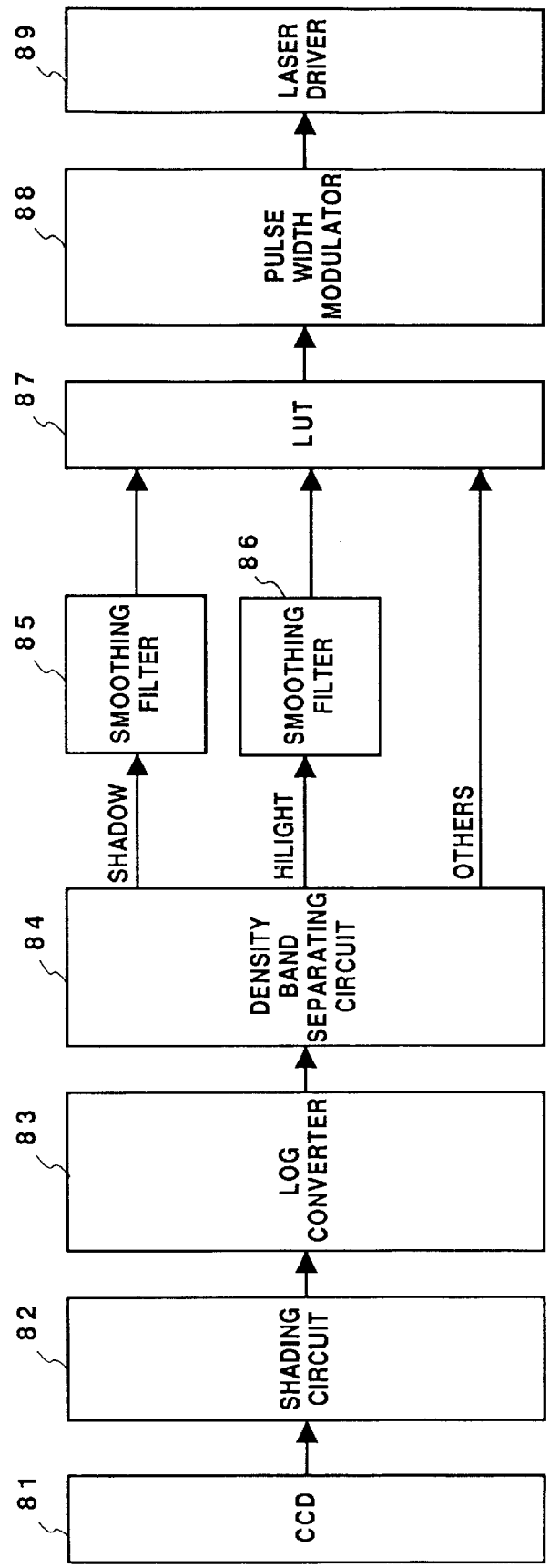
FIG. 8 is a block diagram which illustrates the internal construction of an essential portion of a digital electrophotographic copier of a second embodiment of the present invention.

FIG. 8 is a block diagram which illustrates the internal construction of an essential portion of a digital electrophotographic copier of a second embodiment of the present invention. In this figure, a CCD 81, a shading circuit 82, a LOG converter 83, a density band separating circuit 84, a smoothing filter 85, a LUT 87, a pulse width modulator 88, and a laser driver 89 have the same construction and function as those of, respectively, the CCD 1, the shading circuit 2, the LOG converter 3, the density band separating circuit 4, the smoothing filter 5, the LUT 7, the pulse width modulator 8, and the laser driver 9. Reference numeral 86 denotes a smoothing filter for the highlighted section.

In the highlighted section, to avoid blurring, a threshold value is set for a voltage applied during development. Development at a density smaller than a set density is impossible. In this second embodiment, the density band separating circuit 84 separates a highlighted section under the condition that the density value thereof is 0.2 (density level 15) or less and the highlighted section is smoothed by the smoothing filter 86. Also the shadow section is separated under the condition that the density value thereof is 1.3 (density level 102) or more, and is smoothed by the smoothing filter 85. In the second embodiment, a smoothing filter which is the same as that in the above-described first embodiment is used.

Figure 9:
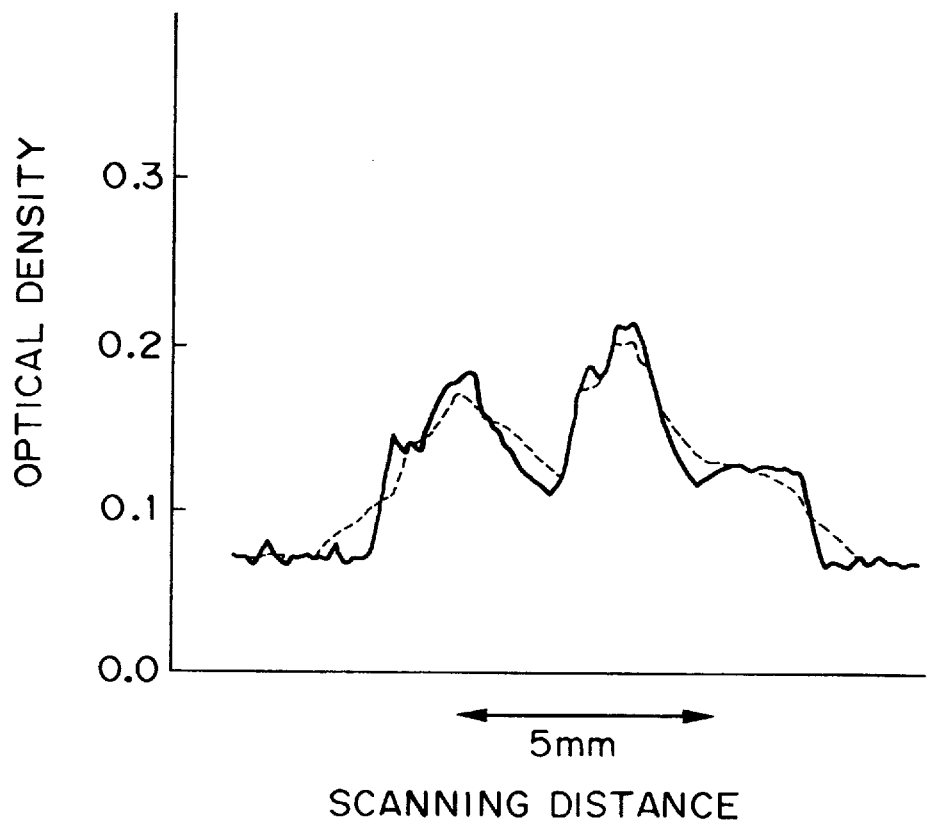
FIG. 9 is a diagram which illustrates variations in scanned density.

An explanation will now be given relative to an example of a smoothing operation of the second embodiment. FIG. 9 is a diagram which illustrates variations in scanned density. In this figure, shown are variations in the scanned density of a reproduced image of a pleated section of a white cloth of Electrophotographic Society Chart No. 5 (test chart) of a female portrait image.

The density is measured by using a microdensitometer having an opening of approximately 100×100 $\mu m^2$. In FIG. 9, the solid line indicates variations in the density caused by conventional image processing. The change from density 0.08 to 0.14 is sharp, and therefore the texture of the pleats of a white cloth deteriorates. The broken line in FIG. 9 indicates variations in the density caused by the image processing of the second embodiment.

Variations in the density are gradual because of the smoothing operation in comparison with the prior art. The smoothness of the pleats of a white cloth reproduced, thus effecting a faithful reproduction of the manuscript.

As described above, the shadow section and the highlighted section are separated according to an image density band. The gradation of both the shadow section and the highlighted section can be differentiated in a simulated manner by performing a smoothing operation on these sections. As a result, an excellent gradational image can be obtained.

(Third Embodiment)

This embodiment of the present invention is a modification of the second embodiment thereof. A point of difference between this embodiment and the second embodiment is that a coefficient of the smoothing filter 85 of the second embodiment is different from that of the smoothing filter 86 of the third embodiment. That is, a smoothing filter of W=¼ [1,2,1] is used in an operation for smoothing the shadow section by the smoothing filter 85 in the second embodiment, whereas in an operation for smoothing the highlighted section by the smoothing filter 86, a smoothing filter of W=⅓ [1,1,1] is used in the third embodiment.

Since the discontinuity of density gradation is conspicuous as an image defect of pseudo-contours in the highlighted section, the degree of the smoothness is made stronger than the shadow section. The coefficients of these smoothing filters should preferably be set at optimum conditions in conformity with the characteristics of an image forming apparatus.

A smoothing calculation equation is as shown below:

$$g(x) = \sum_{i=1}^{3} W(i)f(x-i)$$

where f (x−i) is an input pixel density and g (x) is an output pixel density.

Although in this embodiment, an explanation has been given about a one-dimensional filter, generally two-dimensional filters may also be used. The present invention can also be applied to such case.

A smoothing a highlighting calculation equation using a two-dimensional filter is as shown below:

$$g(x) = \sum_{\substack{i=-1 \text{ to } +1 \\ j=-1 \text{ to } +1}} W(x+1, y+j)f(x+1, y+j)$$

No smoothing operation was performed on a half-tone area having a density of 1.3 (density level of 166) or smaller, or a density of 0.2 (density level of 26) or greater, because the deterioration of the gradation due to the missing density signals was small.

Each gradation of the shadow and highlighted sections can be corrected in a simulated manner by separating image areas into shadow and highlighted sections and performing a smoothing operation appropriate for each area. As a result, excellent gradational images can be obtained.

(Fourth Embodiment)

Another embodiment of a full-color gradational image forming apparatus of the present invention will be explained below in detail with reference to the accompanying drawings.

Figure 10:
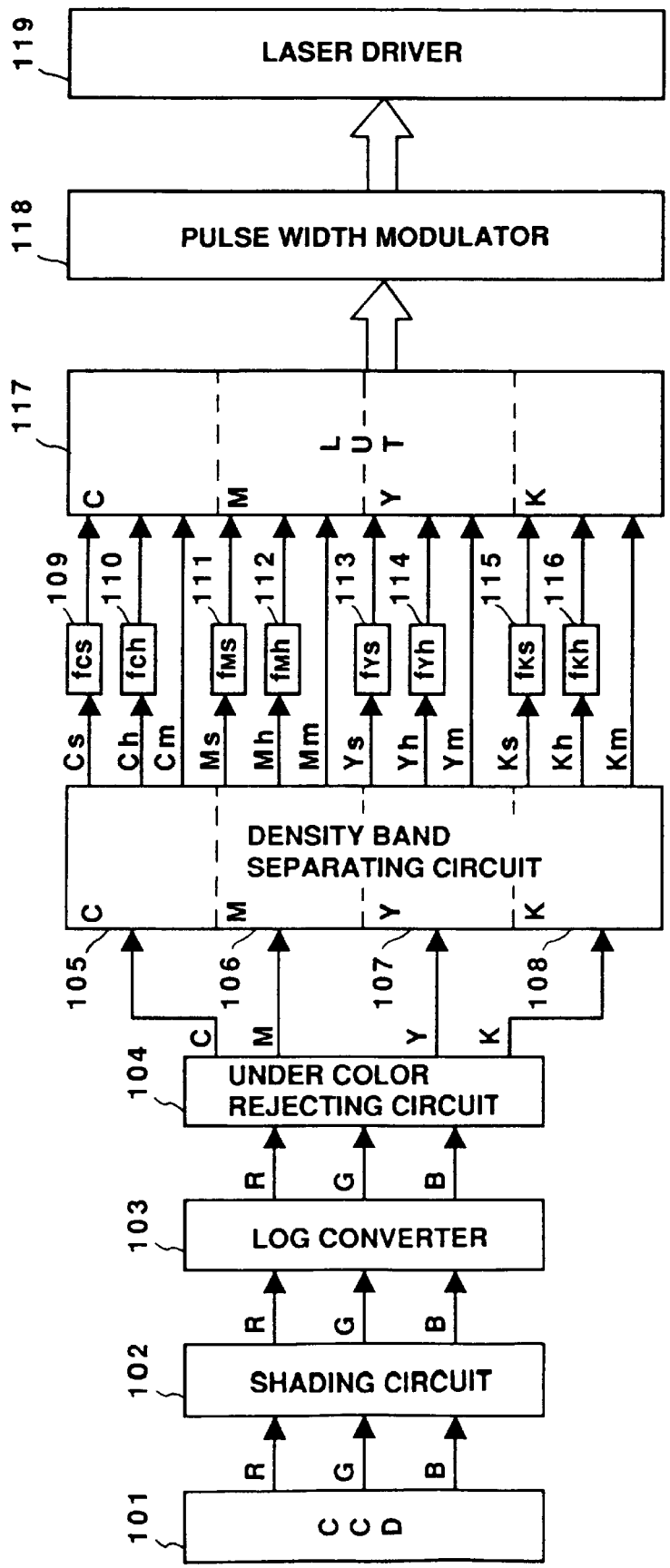
FIG. 10 is a block diagram which illustrates a fourth embodiment of the invention.

FIG. 10 is a block diagram which illustrates a fourth embodiment of the present invention in which an image forming apparatus is applied to a full-color digital electrophotographic copier. In this figure, reference numeral 101 denotes a CCD; reference numeral 102 denotes a shading circuit; reference numeral 103 denotes a LOG converter; reference numeral 104 denotes an under color rejecting circuit; reference numeral 105 denotes a cyan color density separating circuit; reference numeral 106 denotes a magenta color density separating circuit; reference numeral 107 denotes a yellow color density separating circuit; reference numeral 108 denotes a black color density separating circuit; reference numeral 109 denotes a cyan-color shadow-section smoothing filter fCs; reference numeral 110 denotes a cyan-color highlighted-section smoothing filter fCh; reference numeral 111 denotes a magenta-color shadow-section smoothing filter fMs; reference numeral 112 denotes a magenta-color highlighted section smoothing filter fMh; reference numeral 113 denotes a yellow-color shadow-section smoothing filter fYs; reference numeral 114 denotes a yellow-color highlighted-section smoothing filter fYh; reference numeral 115 denotes a black-color shadow-section smoothing filter fKs; reference numeral 116 denotes a black-color highlighted-section smoothing filter fKh; reference numeral 117 denotes a LUT; reference numeral 118 denotes a pulse width modulator; and reference numeral 119 denotes a laser driver.

The flow of data according to the above-described construction will now be explained.

An image is converted into brightness signals by the CCD 101 and is provided to the shading circuit 102 which corrects the variations in the sensitivities of the CCD elements. The brightness signals are then converted into density signals by the LOG converter 103. In this embodiment, density 2.0 corresponds to a density level of 255.

Concerning the density signals of each color, black components are separated by the under color rejecting circuit 104 in order to increase the reproducibility of the black color. The density signals of each color are separated by corresponding color density separating circuits 105 to 108 into shadow and highlighted sections. In a full color image, image reproducing characteristics differ from color to color.

A skin color is often noticed when a color is evaluated. A skin color is expressed by mixing the highlighted sections of mainly yellow and magenta. Therefore, it is desirable that the density separation level of a highlighted section of magenta and yellow be set higher than those of other colors.

A design in which priority is given to the smoothness of the density is more preferable, because it is more difficult for the human eye to discriminate a difference in density regarding yellow than it is to discriminate those of other colors in a shadow section. Concerning yellow, it is desirable that the density separation level of the shadow section be set lower than those of the other colors.

FIG. 11 is a table which shows the density separation level of each of the colors used in this embodiment. The same smoothing filters as the filters used for the shadow and highlighted sections in the second embodiment are used for smoothing filters 109 to 116 for the respective colors.

Figure 12:
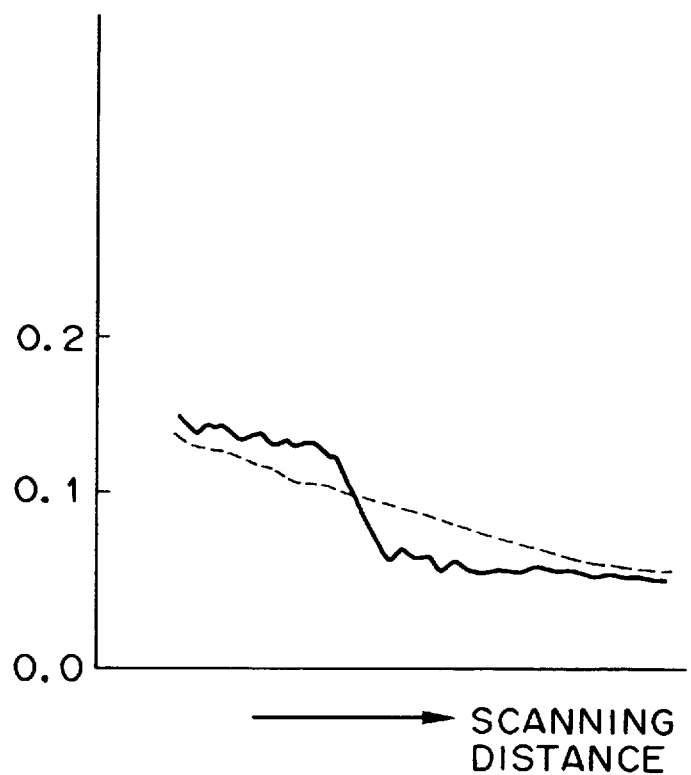
FIG. 12 is a diagram which illustrates variations in the scanning density according to the fourth embodiment.

FIG. 12 is a diagram which illustrates variations in the scanning density according to this embodiment. In this figure, variations in the scanned density of a reproduced image of a cheek of a female's face from the Electrophotographic Society Chart No. 5 of a female portrait image are shown.

The measurement of density is performed by the use of light which has passed through a visual (umber) filter by using a microdensitometer having an opening of approximately 100 μm×100 μm. The solid line indicates variations in the density according to the conventional image processing. The change from density 0.16 to 0.07 is sharp, so the low-density portion of the cheek undesirably appears in the base of a recording paper.

The broken line indicates variations in the density according to the image processing of this embodiment. The variations in the density are gradual because of this smoothing operation, thus effecting a reproduction of smooth skin color and a reproduction faithful to the original manuscript.

As described above, the shadow section and the highlighted section are separated into different image areas for each color. The gradation of both the full-color shadow and highlighted sections can be corrected in a simulated manner. Thus, excellent gradational images can be obtained.

(Fifth Embodiment)

Figure 13B:
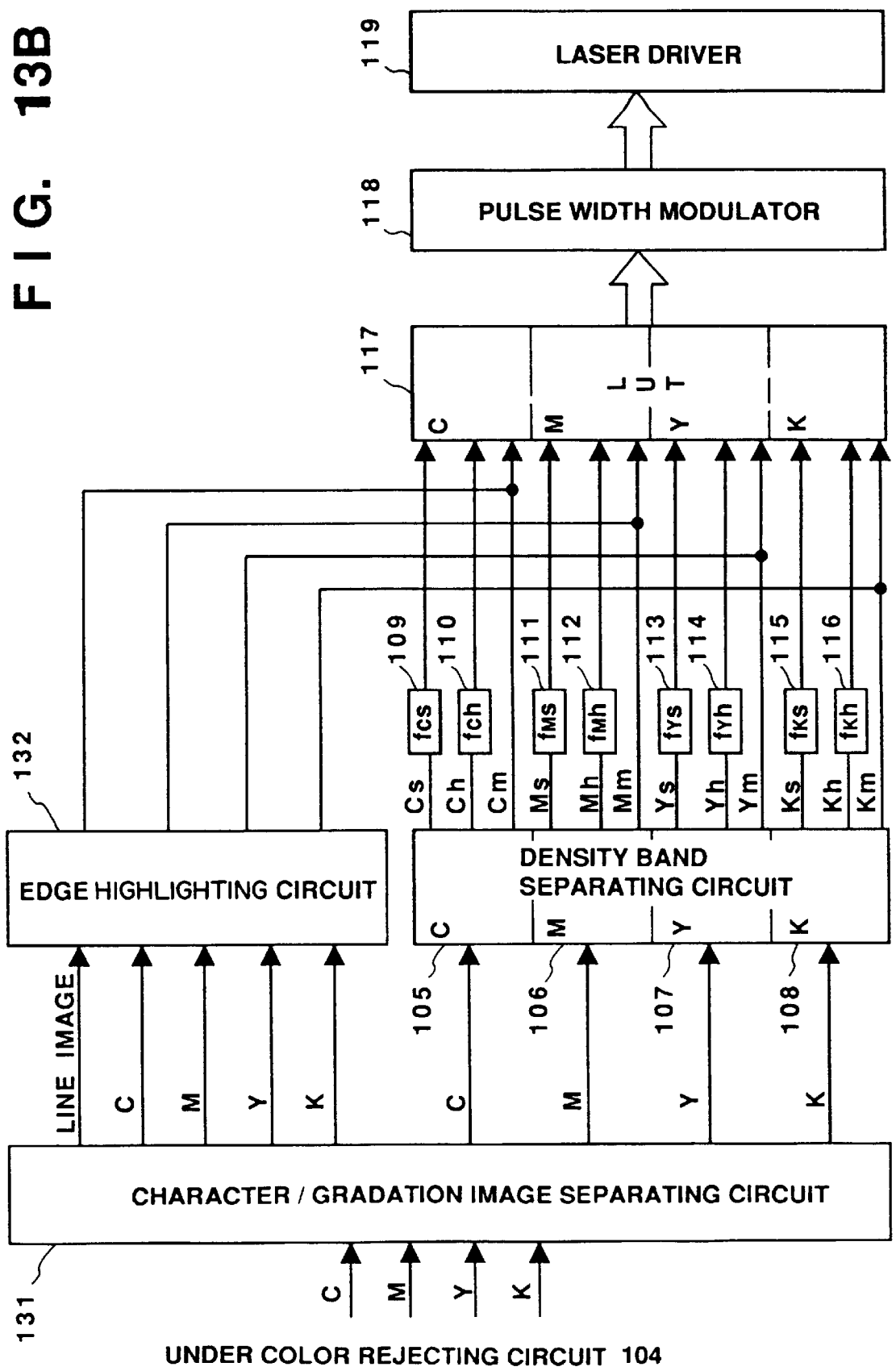

FIGS. 13A and 13B are block diagrams which illustrate a fifth embodiment in which an image forming apparatus of the present invention is applied to a full-color digital electronic copier. In these figures, the sections up to the under color rejecting circuit 104 are the same as the construction of the fourth embodiment. After the under color rejecting circuit 104, a manuscript is separated into a character image area and a gradational image area by a character/gradation image separating circuit 131.

The density signals of the character area are provided to an edge highlighting circuit 132. For edge highlighting, a filter having the following equation is used as filter W.

$$W = \begin{bmatrix} & & 0 & & \\ -1 & 0 & 10 & 0 & -1 \\ & & 0 & & \end{bmatrix}$$

The calculation equation is as shown below:

$$g(x) = \sum_{\substack{i=-2 \text{ to } +2 \\ j=-1 \text{ to } +1}} W(x+i, y+j) f(x+i, y+j)$$

Signals after an edge highlighting operation has been performed on the character area are sent to LUT 117. On the other hand, density signals of the gradational image area are sent to a density band separating circuit in the same manner as in the fourth embodiment, where a smoothing operation appropriate for the density band of each color is performed on the signals, and they are then sent to a LUT 117. The signal from LUT 117 is processed by pulse width modulator 118 and laser driver 119 in a manner similar to that described for like elements in the earlier embodiments. The separation of character/gradation images in this embodiment is performed through a comparison of pixel patterns: that is, (1) image signals are divided into blocks of 4×4 pixels, (2) the pixels in the blocks are binarized by using an average density of the blocks as a binarized threshold value, and (3) when the pixels become patterns shown in FIG. 14, which are likely to occur in a character image, the image is judged to be a character image.

By performing such a character/gradation image separation prior to the separation of density bands, highly colorful reproduced images can be obtained for a full color manuscript in which characters, line images and halftone images are mixed.

(Sixth Embodiment)

Figure 15A:
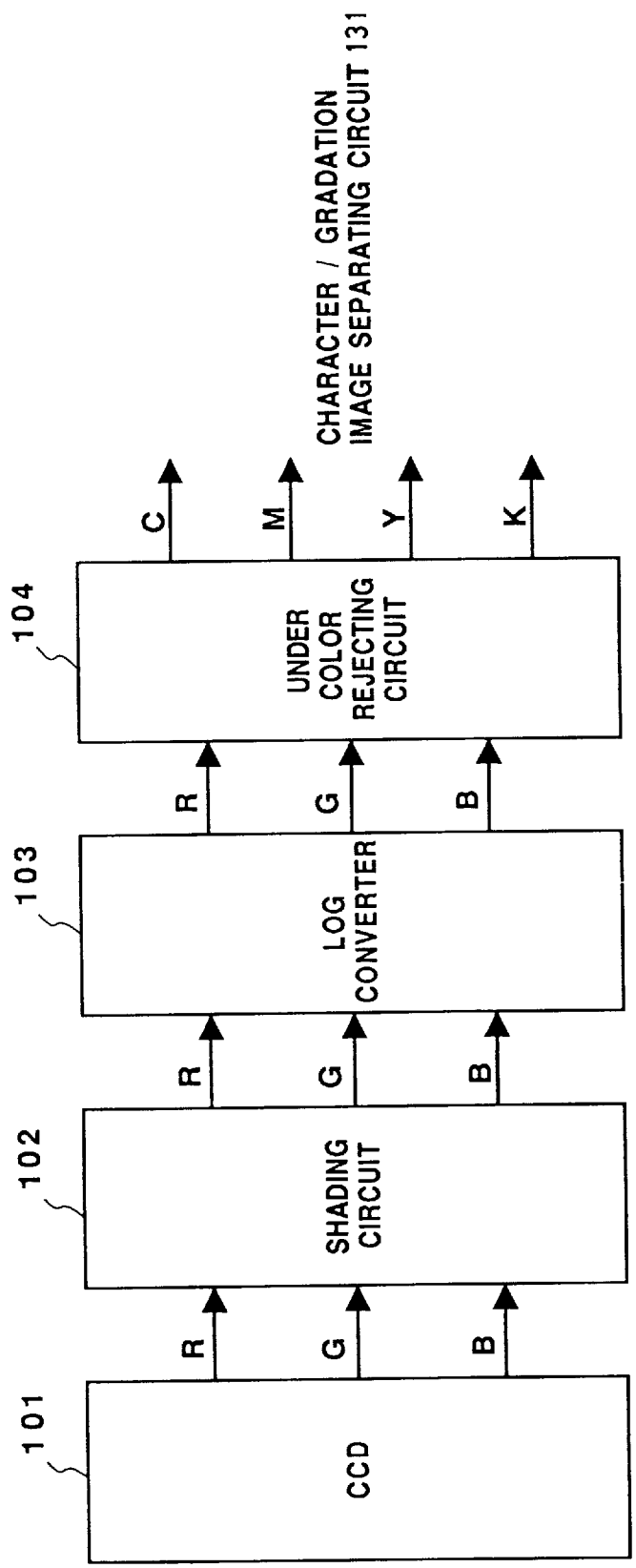
FIGS. 15A and 15B are block diagrams which illustrate a sixth embodiment of the invention.
Figure 15B:
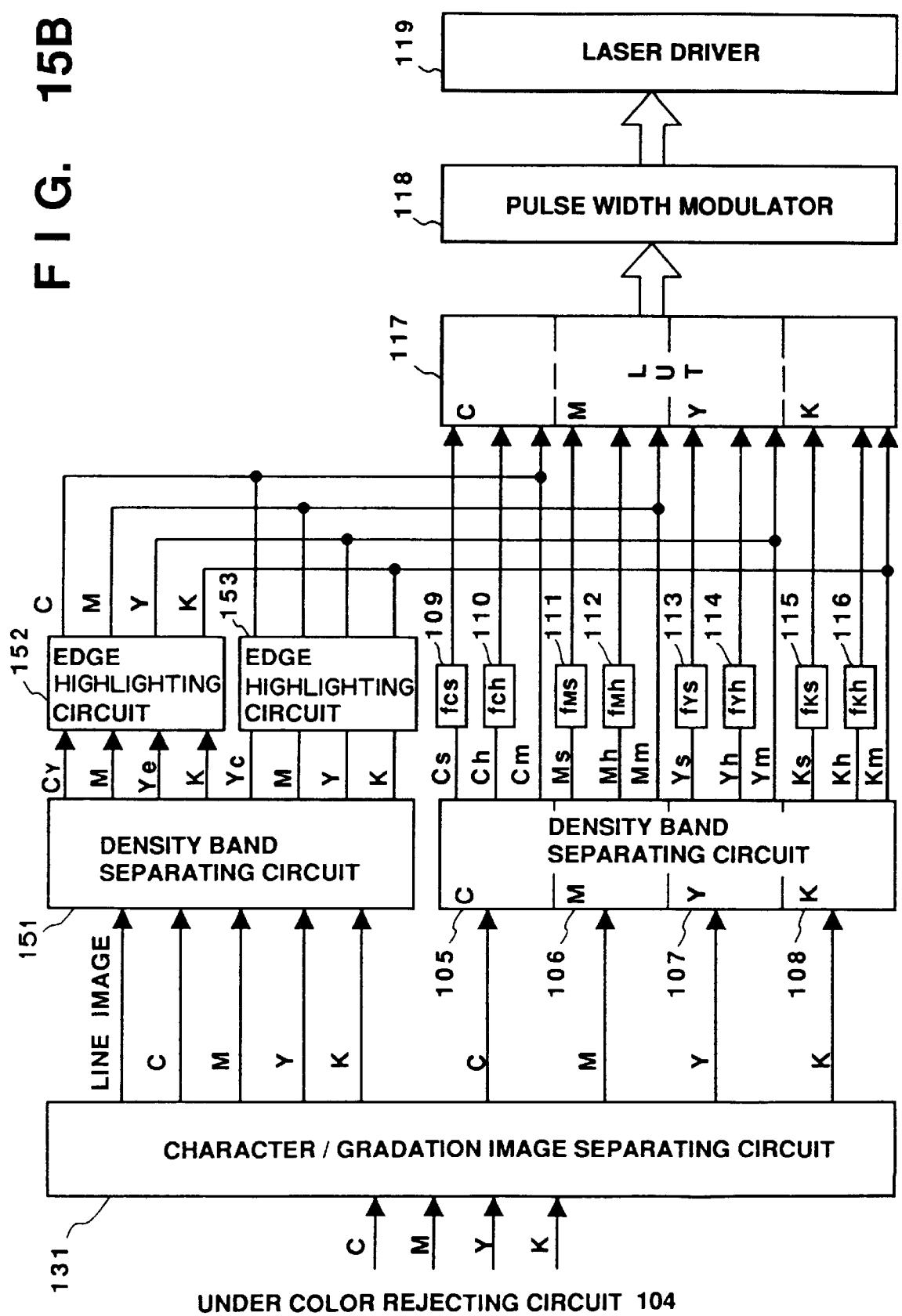

FIGS. 15A and 15B are block diagrams which illustrate a sixth embodiment in which the image forming apparatus of the present invention is applied to a full-color digital electronic copier. In these figures, the section up to a character/gradation image separating circuit 131 is the same as the construction of the fifth embodiment. Reference numeral 151 denotes a density band separating circuit, and reference numerals 152 and 153 denote edge highlighting circuits.

After the manuscript is separated into a character image area and a gradation image area by the character/gradation image separating circuit 131, the character area is separated by a density band separating circuit 151 into those areas of a density level of 170 or lower, and those areas of a density level of 170 or higher. When the density level is 170 or lower, those areas are provided to an edge highlighting circuit 152. When the density level is 170 or higher, those areas are provided to an edge highlighting circuit 153.

Generally, low-density characters are more liable to blur than high-density characters. It is difficult to recognize low-density characters. Therefore, in this embodiment, the degree of edge highlighting is increased for areas having a density level of 170 or lower as compared with areas having a density level of 170 or higher.

To be specific, in the case of areas having a density level of 170 or lower, the filter shown below is used:

$$W = \begin{bmatrix} & & -1 & & \\ -4 & 0 & 22 & 0 & -4 \\ & & -1 & & \end{bmatrix}.$$

In the case of areas having a density level of 170 or higher, the filter shown below is used:

$$W = \begin{bmatrix} & & 0 & & \\ -1 & 0 & 10 & 0 & -1 \\ & & 0 & & \end{bmatrix}$$

The calculation equation is the same as that used in the fifth embodiment. The way of processing gradation images is the same as that in the fifth embodiment.

Because of the above-described image processing, clear, legible character images can be obtained.

In the above explanation, the electrophotographic method is taken as an example of a method for use with an apparatus which realizes such a method in the above-described embodiments. Needless to say, the present invention can be applied to recording apparatuses using other methods, such as ink jet printers including bubble jet printers, silver halide photographic printers, or thermal transfer printers.

As had been explained above, according to the present invention, the deviation of data caused by the quantization of numeric values peculiar to digital processing is decreased, thus effecting smooth gradational reproduction.

Many different embodiments of the present invention may be constructed without departing from the spirit and scope of the present invention. It should be understood that the present invention is not limited to the specific embodiments described in this specification, and is defined in the appended claims.

What is claimed is:

1. An image processing apparatus comprising:

input means for inputting image data representing an image;

determining means for determining which one of density-level ranges to which each pixel of the image data belongs, said density-level ranges representing all possible density levels of each pixel and including at least either a first range in a neighbor of a minimum density level or a second range in a neighbor of a maximum density level; and process means for performing a conversion process to convert a spatial frequency characteristic of the image data input by said input means, wherein said process means selects the conversion process applied to a pixel based on the determination result of said determining means.

2. An apparatus according to claim 1, wherein said process means comprises a smoothing filter.

3. An apparatus according to claim 1, wherein said process means comprises an edge emphasizing filter.

4. An apparatus according to claim 1, wherein said input means inputs image data of a plurality of color components representing a color image, and conversion by said process means is performed on image data of each of said plurality of color components.

5. An apparatus according to claim 4, wherein said plurality of color components include cyan, magenta, and yellow.

6. An apparatus according to claim 4, wherein the a combination of the density-level ranges is different for respective ones of the plurality of color components.

7. An apparatus according to claim 1, further comprising separation means for separating the image data input by said input means into character image data and gradation image data, and wherein said process means performs conversion on the gradation image data.

8. An apparatus according to claim 1, wherein said input means comprises an image sensor.

9. An apparatus according to claim 1, further comprising image forming means for forming an image in accordance with an output of said process means.

10. An image processing method comprising:

an input step of inputting image data representing an image;

a determination step of determining which one of density-level ranges to which each pixel of the image data belongs, said density-level ranges representing all possible density levels of each pixel and including at least either a first range in a neighbor of a minimum density level or a second range in a neighbor of a maximum density level; and a process step of performing a conversion process to convert a spatial frequency characteristic of the image data input by said input step, wherein said process step selects the conversion process to a pixel based on the determination result of said determination step.

11. An image processing apparatus comprising:

input means for inputting image data comprised of a plurality of pixels, each such pixel having a density in a predetermined density range;

separating means for separating each one of the plurality of pixels into one of a first density band in the predetermined density range if the pixel has a density less than or equal to a first threshold density level, a second density band in the predetermined density range if the pixel has a density less than or equal to a second threshold density level, with the second threshold density level being greater than the first threshold density level, and a third density band if the pixel has a density greater than the first threshold density level and less than the second threshold density level;

a first smoothing filter for smoothing each pixel separated into the first density band;

a second smoothing filter for smoothing each pixel separated into the second density band; and recombining means for recombining the pixels in the first density band which were smoothed by the first smoothing filter, the pixels in the second density band which were smoothed by the second smoothing filter and the pixels in the third density band to form recombined image data.

* * * * *